US005948748A

United States Patent [19]

Hagino et al.

[11] Patent Number: 5,948,748

[45] Date of Patent: Sep. 7, 1999

[54] DETERGENT COMPOSITION

[75] Inventors: Genjiro Hagino; Shuji Tagata; Sachiko Kamioka, all of Wakayama, Japan

[73] Assignee: Kao Corporation, Tokyo, Japan

[21] Appl. No.: 09/077,667

[22] PCT Filed: Oct. 2, 1997

[86] PCT No.: PCT/JP97/03528

§ 371 Date: Jun. 3, 1998

§ 102(e) Date: Jun. 3, 1998

[87] PCT Pub. No.: WO98/15610

PCT Pub. Date: Apr. 16, 1998

[30] Foreign Application Priority Data

Oct. 8, 1996 [JP] Japan .................................... 8-267412

[51] Int. Cl.[6] ................................ C11D 3/26; C11D 3/20; C11D 3/37; C08L 101/10

[52] U.S. Cl. .......................... 510/480; 510/477; 510/488; 510/475; 525/419

[58] Field of Search ............................ 525/419; 510/477, 510/488, 475, 480

[56] References Cited

U.S. PATENT DOCUMENTS

| | | | |
|---|---|---|---|
| 4,349,447 | 9/1982 | Noguchi et al. | 510/480 |
| 4,849,125 | 7/1989 | Seiter et al. | 510/443 |

FOREIGN PATENT DOCUMENTS

| | | |
|---|---|---|
| 50-81399 | 1/1975 | Japan . |
| 56-81399 | 7/1981 | Japan . |
| 5-170714 | 7/1993 | Japan . |
| 6-100884 | 4/1994 | Japan . |
| 6-248300 | 9/1994 | Japan . |
| 6293897 | 10/1994 | Japan . |
| 10060495 | 3/1998 | Japan . |
| 10110198 | 4/1998 | Japan . |
| 10279996 | 10/1998 | Japan . |
| 10316995 | 12/1998 | Japan . |
| 10316996 | 12/1998 | Japan . |
| 10330787 | 12/1998 | Japan . |
| 10330789 | 12/1998 | Japan . |
| 1 439 518 | 6/1976 | United Kingdom . |

*Primary Examiner*—Vasu Jagannathan
*Assistant Examiner*—Ling-Siu Choi
*Attorney, Agent, or Firm*—Birch, Stewart, Kolasch & Birch, LLP

[57] ABSTRACT

The present invention provides a detergent composition containing an N,N-bis(carboxymethyl)glutamic acid salt as an organic builder and being more excellent in detergency than otherwise. The detergent composition comprises (a) an anionic surfactant, (b) a salt of a polymer comprising carboxylic acid units and having a specific molecular weight, (c) an N,N-bis(carboxymethyl)glutamic acid salt represented by the following formula (I), and (d) a crystalline aluminosilicate at specific proportions:

(I)

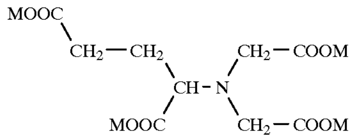

wherein M is a hydrogen atom, an alkali metal, an alkaline earth metal, an ammonium or a basic amino group, provided that a plurality of M's may be the same as or different from each other.

6 Claims, No Drawings

DETERGENT COMPOSITION

This application is the national phase under 35 U.S.C. §371 of prior PCT International Application No. PCT/JP97/03528 which has an International filing date of Oct. 2, 1997 which designated the United States of America, the entire contents of which are hereby incorporated by reference.

BACKGROUND OF THE INVENTION

1. Field of the Invention

The present invention relates to a detergent composition. In particular, it relates to a detergent composition which contains a water-soluble amino polycarboxylic acid compound excellent in biodegradability and exhibits excellent detergency.

2. Description of Related Art

A detergent for clothes is composed of a surfactant which solubilizes soil, separates it from fibers, and dissolves or disperses it in a water for washing, an alkali agent which accelerates the decomposition or solubilization of soil, a polymeric substance which suspends soil, a sequestering agent which removes substances lowering the power of surfactants, for example, calcium, magnesium and so on from a water for washing, and so on.

Among these components, the substance, called a builder in general, does not exhibit detergency by itself, but can enhance the detergency of a surfactant used together. In the builder for a detergent, the above-mentioned sequestering agent serves to make a surfactant exhibit its performance more effectively, thus being one of extremely important builders.

Phosphorus compounds such as sodium tripolyphosphate were formerly added to a detergent for clothes as the builder (i.e., sequestering agent). However, phosphorus compounds were believed to be one of the factors causing the eutrophication of rivers, lakes, ponds and so on. In the detergent industry, therefore, the use of phosphate builders was self-restrained, while the development of a detergent without any phosphate builder had been continued. As a result, a zeolite, a crystalline sodium aluminosilicate, having a specific structure was used as the main component of the sequestering agent.

Although the zeolite was used as the main builder substitute for phosphorus compounds, it had some problems that the performance thereof in low-temperature washing in a short time was often unsatisfactory and that the degree of freedom of the formulation was restricted in order to decrease the quantity of insolubles derived from zeolite which was essentially insoluble in water.

Owing to the recent high concern about the influence on the environment, studies have been made on organic builders excellent in biodegradability and sequestering performance. There is so this background that, for example, a specific organic builder prepared by the reaction of epoxysuccinic acid or maleic acid with aspartic acid and a detergent composition containing it is disclosed in JP-A 5-170714, and a detergent composition containing a builder consisting of hydroxyiminodisuccinic acid in a specific amount is disclosed in JP-A 6-248300.

Further, it is suggested in JP-A 50-3979 and JP-A 56-81399 that an N,N-bis(carboxymethyl)glutamic acid salt is superior to the above organic builders in calcium sequestering performance and biodegradability, and such a salt is usable as builders for a detergent. However, these patent documents are silent on the detergent composition which enable the builders to exhibit their effects sufficiently.

DISCLOSURE OF THE INVENTION

Summary of the Invention

An object of the present invention is to find the optimum formulation bringing about higher detergency with respect to a detergent composition prepared by adding an N,N-bis(carboxymethyl)glutamic acid salt, which is a biodegradable water-soluble chelating agent, to a composition comprising both an anionic surfactant as the base and a zeolite which is an inorganic builder.

The inventors of the present invention have intensively studied to find that the above problems can be solved by a detergent composition prepared by adding an N,N-bis(carboxymethyl)glutamic acid salt and a carboxylated polymer respectively in specific proportions to a composition comprising both an anionic surfactant and a zeolite. The present invention has been accomplished on the basis of this finding.

Namely, the present invention provides a detergent composition comprising (a) 15 to 50% by weight of an anionic surfactant, (b) a polymer comprising units derived from at least one member selected from the group consisting of monoethylenically unsaturated monocarboxylic acids and monoethylenically unsaturated dicarboxylic acids and having a weight-average molecular weight of 1,000 to 150,000, or a salt of the polymer, (c) an N,N-bis(carboxymethyl)glutamic acid salt represented by the following formula (I):

(I)

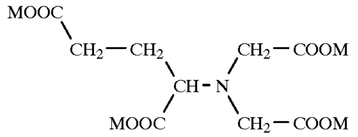

wherein M is a hydrogen atom, an alkali metal, an alkaline earth metal, an ammonium or a basic amino group, provided that a plurality of M's may be the same as or different from each other, and (d) 5 to 40% by weight of a crystalline aluminosilicate, the total amount of the components (b) and (c) being 1 to 20% by weight based on the composition, the weight ratio of the component (b) to the component (c) ranging from 1/10 to 10/1.

In the present invention, an anionic surfactant is used as the component (a) in an amount of 15 to 50% by weight, preferably 25 to 45% by weight. The use thereof in such an amount brings about satisfactory detergency and facilitates the preparation of the detergent composition. The anionic surfactant usable in the present invention is one or more surfactants selected from the group consisting of alkylbenzenesulfonates having 8 to 16 carbon atoms, alkanesulfonates (SAS), α-olefinsulfonates, sulfates of primary or secondary higher (fatty) alcohols and α-sulfo fatty acid salts.

The polymer or salt thereof as the component (b) is one comprising units derived from at least one member selected from the group consisting of monoethylenically unsaturated monocarboxylic acids and monoethylenically unsaturated dicarboxylic acids and having a weight-average molecular weight of 1,000 to 150,000, preferably 10,000 to 100,000, desirably a (co)polymer comprising repeating units represented by the following formula (IV) or a salt of the polymer.

The salt of the copolymer may be any of partially and wholly neutralized ones.

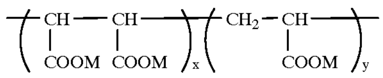
(IV)

wherein M is a counter ion and a copolymerizing ratio of x/y ranges from 0/10 to 5/5 as a mole ratio.

This copolymer salt is a sodium or potassium salt of a homo- or copolymer prepared by polymerizing maleic acid (i) with acrylic acid (ii) at a (i) to (ii) mole ratio of 0/10 to 5/5, preferably 2/8 to 5/5, and having a weight-average molecular weight of 1,000 to 150,000, preferably 10,000 to 100,000. When the (i) to (ii) mole ratio or the molecular weight deviates from the above range, the composition will show no satisfactory detergency.

In the present invention, an N,N-bis(carboxymethyl) glutamic acid salt represented by the following formula (I) is used as the component (c):

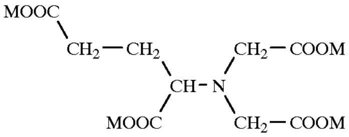
(I)

wherein M is a hydrogen atom, an alkali metal, an alkaline earth metal, an ammonium or a basic amino group, provided that a plurality of M's may be the same as or different from each other.

In the present invention, excellent detergency can be attained by adding the N,N-bis(carboxymethyl)glutamic acid salt (c) in a total amount of the components (b) and (c) of 1 to 20% by weight, preferably 1 to 10% by weight based on the composition and at a (b) to (c) weight ratio of 1/10 to 10/1, preferably 3/10 to 10/3, still preferably 3/7 to 7/3. When the (b) to (c) weight ratio deviates from this range, the composition will show no satisfactory detergency.

A crystalline aluminosilicate is used as the component (d), which is generally called "zeolite" and represented by the following formula (i), preferably by the following formula (ii):

$$a'(M_2O)\cdot Al_2O_3\cdot b'(SiO_2)\cdot w(H_2O) \qquad (i)$$

wherein M is an alkali metal; and a', b' and w represent molar ratios of the components and, in general, $0.7 \leqq a' \leqq 1.5$, $0.8 \leqq b' < 6$, and w is an arbitrary positive number, $$Na_2O\cdot Al_2O_3\cdot n(SiO_2)\cdot w(H_2O) \qquad (ii)$$

wherein n is a number of 1.8 to 3.0; and w is a number of 1 to 6.

The crystalline aluminosilicate (zeolite) to be used is desirably a synthetic zeolite having an average primary particle diameter of 0.1 to 10 μm, for example, zeolite A, X or P. The zeolite may be added in the form of a powder and/or a dry agglomerate prepared by drying a zeolite slurry. In the present invention, such a crystalline aluminosilicate is added in an amount of 5 to 40% by weight, preferably 10 to 35% by weight based on the composition. When the amount of the crystalline alminosilicate used lies in this range, the composition will show an excellent detergency.

DETAILED DESCRIPTION OF THE INVENTION

The detergent composition of the present invention may further contain optional components which will now be described, in addition to the above essential components (a), (b), (c) and (d).

The nonionic surfactant to be optionally used includes $C_8$–$C_{22}$ polyoxyethylene alkyl ethers, polyoxyethylene alkylphenyl ethers, higher fatty acid alkanolamides and adducts thereof with alkylene oxides, sucrose fatty acid esters, alkyl and alkenyl glucosides, glycerol fatty acid monoesters and adducts thereof with alkylene oxides, and alkylamine oxides. The amphoteric surfactant to be optionally used includes amino acid base surfactants and N-acylamino acid base ones, while the cationic surfactant to be optionally used includes quaternary ammonium salts. Further, conventional builders for detergent may optionally be used, and specific examples thereof include carbonate salts such as soda ash, sulfate salts, sulfite salts, silicates, crystalline silicates, polyglyoxylic acid salts described in JP-A 54-52196, citric acid, oxydisuccinic acid, and nitrilotriacetic acid salts.

In particular, it is preferable that the detergent composition of the present invention contains a crystalline silicate. The term "crystalline silicate" used in this invention is such that a 0.1% dispersion liquid thereof may have the maximum pH of 11 or above (at 25° C.) and in particular 5 ml or more of a 0.1N aqueous solution of HCl may be necessary to decrease the pH of one liter of a 0.1% dispersion liquid of the crystalline silicate to pH 10 and it may be excellent in not only alkalinity but also alkali buffer capacity. In the present invention, alkali metal salts of silicic acid ($SiO_2$) are preferably used, among which alkali metal silicates having a $SiO_2$ to $M_2O$ ratio of 0.5 to 2.6 (wherein M is an alkali metal) are still preferable. Although the $SiO_2$ to $Na_2O$ ratios of known crystalline silicates lie within the range of 1.9 to 4.0, crystalline silicates having $SiO_2$ to $Na_2O$ ratios exceeding 2.6 are often unsuitable for high-density detergents.

Examples of the crystalline silicates to be favorably used in the present invention include those having the following compositions:

$$① x(M_2O)\cdot y(SiO_2)\cdot z(Me_mO_n)\cdot w(H_2O) \qquad (II)$$

wherein M is a Group Ia element of the periodic table; Me is one element selected from the group consisting of Group IIa, IIb, IIIa, IVa and VIII elements of the periodic table or a combination of two or more elements selected therefrom; y/x is 0.5 to 2.6; z/x is 0.01 to 0.9; w is 0 to 20; and n/m is 0.5 to 2.0, and $$② M_2O\cdot x'(SiO_2)\cdot y'(H_2O) \qquad (III)$$

wherein M is an alkali metal; x' is 1.5 to 2.6; and y' is 0 to 20.

First, the crystalline silicates ① represented by the above formula (II) will be described.

In the formula (II), M is selected from among Group Ia elements of the periodic table, and such elements include Na, K and so on. The $M_2O$ component may be constituted of an oxide of one of the elements, or alternatively, it may be constituted of oxides of two or more of them, for example, a mixture of $Na_2O$ with $K_2O$.

Me is selected from the group consisting of the Group IIa, IIb, IIIa, IVa and VIII elements of the periodic table, and examples of such elements include Mg, Ca, Zn, Y, Ti, Zr and Fe. Among them, Mg and Ca are preferable from the standpoints of resources and safety, though Me is not particularly limited. The $Me_mO_n$ component may be constituted of an oxide of one of the elements, or alternatively it may be constituted of oxides of two or more of them, for example, a mixture of MgO with CaO.

In the formula (II), y/x is 0.5 to 2.6, preferably 1.5 to 2.2. When y/x is less than 0.5, the resulting silicate will be poor in resistance to dissolution in water (water resistance), which will exert remarkable adverse effects on the physical properties of the detergent composition as powder, for example, caking properties and solubility . On the contrary, when y/x exceeds 2.6, the resulting silicate will be unsatisfactory as alkali agent owing to its low alkalinity and as ion exchanger owing to its poor ion-exchange capacity. In the formula (II), z/x is 0.01 to 0.9, preferably 0.02 to 0.9, still preferably 0.02 to 0.5. When z/x is less than 0.01, the resulting silicate will be poor in water resistance, while when z/x exceeds 1.0, the resulting silicate will be poor in ion exchange capacity to result in an unsatisfactory ion exchanger. No particular limitation is placed on x, y and z, so far as x, y and z satisfy the relationships represented by the y/x and z/x. When the $x(M_2O)$ component is $x'(Na_2O)\cdot x''(K_2O)$ as described above, x is x' plus x'. Such a relationship applies also to z, when the $z(Me_mO_n)$ component is composed of two or more members. Further, n/m means the number of oxide ions coordinating to the element Me, which is selected substantially from the group consisting of 0.5, 1.0, 1.5 and 2.0.

The crystalline silicate represented by the formula (II) is composed of three components, i.e., $M_2O$, $SiO_2$ and $Me_mO_n$. Therefore, raw materials for the three components are necessary in preparing the crystalline silicate represented by the formula (II). The raw materials are not particularly limited, but may suitably be selected from among known compounds. For example, the raw material for the $M_2O$ or $Me_mO_n$ component includes oxides, composite oxides, hydroxides and salts of the elements and minerals containing the elements. Specifically, the raw material for the $M_2O$ component includes NaOH, KOH, $Na_2CO_3$, $K_2CO_3$, $Na_2SO_4$ and so on, while that for the $Me_mO_n$ component includes $CaCO_3$, $MgCO_3$, $Ca(OH)_2$, $Mg(OH)_2$, MgO, $ZrO_2$, dolomite and so on. The raw material for the $SiO_2$ component includes silica rock, kaolin, talc, fused silica, sodium silicate and so on.

The crystalline silicate represented by the formula (II) can be produced by, for example, a process which comprises mixing the above raw materials at such a predetermined ratio as to give the x, y and z values of the objective crystalline silicate, and firing the obtained mixture generally at 300 to 1500° C. preferably at 500 to 1000° C., still preferably at 600 to 900° C. to conduct crystallization. When the firing is conducted at a temperature lower than 300° C., the resulting silicate will be poor in water resistance owing to its low crystallinity, while when it is conducted at a temperature exceeding 1500° C., course grains will be formed to result in a poor ion exchange capacity. The heating time is generally 0.1 to 24 hours. The firing may be conducted by the use of an electric or gas furnace or other heating furnaces.

The produced crystalline silicate represented by the formula (II) exhibits a pH of 11 or above in the form of a 0.1% by weight aqueous dispersion thereof, thus being excellent in alkalinity. Further, it is particularly excellent in alkali buffer effect and the effect is more excellent than that of sodium carbonate or potassium carbonate.

The crystalline silicate has an ion exchange capacity of at least 100 $CaCO_3$ mg/g, preferably 200 to 600 $CaCO_3$ mg/g, and is one of the substances having sequestering power according to the present invention.

As described above, the crystalline silicate represented by the formula (II) has both high alkalinity and alkali buffer effect and exhibits a high ion-exchange capacity, so that the use thereof in a suitably selected amount permits the employment of favorable washing conditions.

It is preferable that the crystalline silicate represented by the formula (II) have an average particle diameter of 0.1 to 100 μm, still preferably 1 to 60 μm. When the average particle diameter exceeds 100 μm, the development of ion exchange of the silicate will be so slow as to bring about a lowering in the detergency, while when it is less than 0.1 μm, the resulting silicate will exhibit high absorptivity for moisture and $CO_2$ owing to its enhanced specific surface area to result in remarkably deteriorated quality. The term "average particle diameter" used in this invention refers to a median diameter of particle size distribution.

The crystalline silicate having the above average particle diameter and particle size distribution can be produced through pulverization by the use of a vibration mill, a hammer mill, a bowl mill, a roller mill or other pulverizers.

Then, the crystalline silicate ② represented by the formula (III) will be described.

The crystalline silicate ② is one represented by the formula (III):

$$M_2O\cdot x'(SiO_2)\cdot y'(H_2O) \quad \text{(III)}$$

wherein M is an alkali metal; x' is 1.5 to 2.6; and y' is 0 to 20. In particular, those represented by the formula (III) wherein $1.7 \leqq x' \leqq 2.2$ and y'=0 are preferable and those having a cation exchange capacity of 100 to 400 $CaCO_3$ mg/g are usable. The crystalline silicate represented by the formula (III) is one of the substances having a sequestering power according to the present invention.

As described above, the crystalline silicate represented by the formula (III) has both high alkalinity and alkali buffer effect and exhibits a high ion-exchange capacity, so that the use thereof in a suitably selected amount permits the employment of favorable washing conditions.

The crystalline silicate represented by the formula (III) is generally prepared by firing amorphous glassy sodium silicate at 200 to 1000° C. to crystallize it, though the production of which is described in JP-A 60-227895. Details of the production are described in, for example, Phys. Chem. Glasses. 7, 127–138 (1966), Z. Kristallogr., 129, 396–404 (1969) and so on. Further, the crystalline silicate represented by the formula (III) is commercially available under the trade name of "Na-SKS-6" ($\delta$-$Na_2Si_2O_5$) from Hoechst Tokuyama Ltd. as powder or granule.

It is preferable that the crystalline silicate represented by the formula (III) as well as the one represented by the formula (II) have an average particle diameter of 0.1 to 100 μm, still preferably 1 to 60 μm.

In the present invention, the crystalline silicates represented by the formula (II) and those represented by the formula (III) may be used each alone or as a mixture of two or more of them. Further, it is preferable that the silicates account for 30 to 100% by weight, still preferably 70 to 100% by weight of the alkali agent contained in the composition.

In the present-invention, the crystalline silicate is added in an amount of 1 to 40% by weight, preferably 5 to 35% by weight based on the composition. When the amount is too small, the resulting composition will be poor in detergency, while when it exceeds 40% by weight, the resulting composition will cause caking or lowering in the physical properties as powder owing to its enhanced adsorptivity for moisture, resulting in a difficult handling.

Further, the detergent composition of the present invention may contain an enzyme such as protease, cellulase, amylase or lipase. Furthermore, it may contain other minor components, and examples of such minor components include conventional perfumes (such as ones described in JP-A 63-101496); foam inhibitors such as silica and silicone; fluorescent brightening agents such as biphenyl-base ones, stilbene-base ones and combinations of both; and anticaking agents such as p-toluenesulfonic acid salts, xylenesulfonic acid salts, acetic acid salts, sulfosuccinic acid salts, talc, finely powdered silica, and clay. Among finely powdered silica and so on, porous one is usable as a carrier for nonionic surfactants. Clay (i.e., smectite clay) is effective also as softener.

The detergent composition of the present invention may further contain a bleach composition such as sodium percarbonate or sodium perborate, with sodium percarbonate being particularly preferable.

The detergent composition of the present invention can take any form selected from the group consisting of liquid, powder and granule, and it can be produced by conventional known processes, for example, spray drying, spray mixing, granulation by pulverization, impregnation with beads containing inorganic builders, processes for producing high-density granular detergents, processes for producing tabletted, flaky or rodlike detergents, or processes for producing liquid detergents by batch or continuous blending.

The process for the production of a powdered or granular detergent composition according to the present invention is not particularly limited, but known processes can be employed for the production. Further, the powdered or granular detergent composition may be one having a high bulk density. The bulk density of the composition can be increased by, for example, a method of spraying a nonionic surfactant on spray-dried particles, a method of making a powdery component containing an oil-absorbing carrier occlude a nonionic surfactant directly. It is optional to refer to disclosures of JP-A 61-69897, 61-69899, 61-69900, 2-222498, 2-222499, 3-33199, 5-86400 and 5-209200. A small portion of the aluminosilicate may be added during the granulation or just before the completion thereof for the purpose of modifying the surfaces of the granules. When a crystalline silicate is used, it is preferable that the silicate be added in the step of enhancing the bulk density or by dry blending. When an alkali metal carbonate is used, it may be added into the slurry, during the granulation, or by dry blending.

When the detergent composition has a powdery or granular form, it is desirable from the standpoint of the physical properties of the composition as powder that the average particle diameter is 200 to 1000 μm, particularly desirably 200 to 600 μm. In this case, the bulk density is about 0.5 to 1.2 g/cm$^3$, preferably about 0.6 to 1.0 g/cm$^3$.

The detergent composition of the present invention may be used in a suitable concentration, which depends on the methods of washing, such as machine washing or immersion, the quantity of clothes or water, the degree of stains, the operating conditions of the machine, or the like. In machine washing, for example, the composition may be used in a concentration of 0.03 to 0.3% by weight.

EXAMPLES

The present invention will now be described in detail by referring to the following Examples, though the present invention is not limited by them.

Synthesis Example 1

Synthesis of tetrasodium N,N-bis(carboxymethyl) glutamate

A reactor was charged with 314.0 g of L-glutamic acid, 350.0 g of a 40% aqueous solution of sodium hydroxide and 200.0 g of water. The temperature of the contents was raised to 90° C., followed by the addition of 110.6 g of prussic acid, 405.4 g of 30% formalin and 450.0 g of a 40% aqueous solution of sodium hydroxide. The resulting mixture was stirred at 105° C. for 2 hours. After the completion of the reaction, the residual prussic acid was decomposed by the addition of 30.0 g of 10% formalin. 1000.0 g of a 40% aqueous solution of sulfuric acid was added to the resulting mixture to conduct crystallization. The crystalline product thus deposited was recovered by filtration to obtain 441.8 g of N,N-bis(carboxymethyl)glutamic acid as a crude crystal. This crude crystal was recrystallized from water/methanol to give 411.9 g of purified N,N-bis(carboxymethyl)glutamic acid (yield: 75.5%). This acid was neutralized with 40% aqueous sodium hydroxide to give a tetrasodium N,N-bis (carboxymethyl)-glutamate.

Synthesis Example 2

Preparation of Crystalline Silicate (2)

Sodium hydroxide (55.9 parts by weight) and potassium hydroxide (8.5 parts by weight) were added to No. 2 sodium silicate ($SiO_2/Na_2O$: 2.5) (1000 parts by weight). The obtained mixture was agitated in a homomixer to dissolve the sodium hydroxide and potassium hydroxide. Finely divided anhydrous calcium carbonate (5.23 parts by weight) and magnesium nitrate hexahydrate (0.13 part by weight) were added to the resulting mixture. The obtained mixture was agitated in a homomixer. A suitable amount of the resulting mixture was transferred to a nickel-made pot, fired at 700° C. in the air for one hour, rapidly cooled, and pulverized to give a crystalline silicate (2) according to the present invention. This powder exhibited a cation exchange capacity (CEC) of as high as 305 $CaCO_3$ mg/g. The average particle diameter of the silicate (2) thus obtained was 22 μm, and a 0.1% dispersion thereof exhibited a pH of 11 or above (at 25° C.). The structure and CEC of this crystalline silicate (2) are as follows:

$$M_2O \cdot 1.8SiO_2 \cdot 0.02M'O$$

wherein M is Na and K, the K/Na being 0.03; and M' is Ca and Mg, the Mg/Ca being 0.01; average particle diameter: 30 μm; cation exchange capacity (CEC): 305 $CaCO_3$ mg/g.

Example 1

Preparation of Detergent Compositions

A detergent composition according to the present invention (Invention 1) was prepared according to the formulation specified in Table 1 by the following process.

An aqueous slurry having a solid content of 50% was prepared by using LSA, AS, nonion, sodium salt of tallow fatty acid, JIS No. 2 sodium silicate, sodium carbonate, potassium carbonate, sodium sulfate, polyethylene glycol, a portion of zeolite (10% of which had been removed), tetrasodium N,N-bis(carboxymethyl)glutamate, polyacrylic acid and a fluorescent dye. This slurry was spray-dried into particles, pulverized, and granulated in a high-speed mixer, followed by the addition of an enzyme and the rest of zeolite as surface modifier and the spraying with a perfume component. Thus, a final detergent composition having a bulk density of 0.8±0.1 g/cm$^3$ was obtained.

Other detergent compositions according to the present invention and comparative ones were prepared according to the formulations specified in Tables 1 and 2 in a similar manner to that described above, wherein the acrylic acid-maleic acid copolymer was added to each slurry, and the crystalline silicate (1) was added in the granulation step.

Performance evaluation

The detergent compositions prepared above were each evaluated for detergency against sebum dirt and mud dirt by the following methods. The results are given in Tables 1 and 2.

(1) Test on detergency against sebum dirt (Preparation of artificially stained cloths)

Artificially stained cloths were prepared by attaching an artificial dirt liquid to cloths. The formulation of the artificial dirt liquid will be described below. The attachment was conducted by applying the artificial dirt liquid on cloths by the use of a gravure roll coater. The preparation of artificially stained cloths was conducted under the conditions of a cell capacity of gravure roll of 58 $cm^3/cm^2$, a coating speed of 1.0 m/min, a drying temperature of 100° C., and a drying time of one minute. Cotton shirting cloth #2003 (a product of Yato Shoten) was used in the above preparation of artificially stained cloths.

[Formulation of artificial dirt liquid]

| | |
|---|---|
| lauric acid | 0.44% by weight |
| myristic acid | 3.09% by weight |
| pentadecanoic acid | 2.31% by weight |
| palmitic acid | 6.18% by weight |
| heptadecanoic acid | 0.44% by weight |
| stearic acid | 1.57% by weight |
| oleic acid | 7.75% by weight |
| trioleic acid | 13.06% by weight |
| n-hexadecyl palmitate | 2.18% by weight |
| squalene | 6.53% by weight |
| crystal of egg white lecithin | 1.94% by weight |
| Kanuma Aka-tsuchi | 8.11% by weight |
| carbon black | 0.01% by weight |
| tap water | the balance |

(Washing conditions and evaluation method)

Five artificially stained cloths (10 cm×10 cm) prepared above and 1 l of an aqueous solution of a sample detergent composition were put in a Terg-O-Tometer to conduct washing at 100 rpm. The washing conditions are as follows:

| | |
|---|---|
| washing time: | 10 min |
| detergent concentration: | 0.067% |
| hardness of water: | 4° DH |
| temperature of water: | 20° C. |
| rinsing: | with tap water for 5 min |

The detergency of each detergent composition was determined by measuring the reflectivities at 550 nm of the unstained cloth and the stained cloths before and after the washing by the use of a self-colorimeter (mfd. by Shimadzu Corporation) and calculating the rate (%) of cleansing according to the following formula, and the average rate of cleansing of five cloths is given as the detergency of the composition:

Rate of cleansing (%)=(reflectivity after washing−that before washing)/(that of unstained cloth−that before washing)×100

(2) Test on detergency against mud dirt

Muddy cloths were prepared by the following process and the detergency of each detergent composition against the muddy cloths was determined in a similar manner to that employed in the above test. *Preparation of muddy cloths (artificially stained cloths)

Kanuma Akadama-tsuchi for horticultural use was dried at 120° C.±5° C. for 4 hours, pulverized and filtered through a 150-mesh screen (opening size: 100 μm). The undersize portion was dried at 120° C.±5° C. for 2 hours and about 150 g thereof was dispersed in one liter of Perclene. Cotton shirting cloth #2023 was brought into contact with the resulting dispersion, followed by brushing. The dispersion was removed, and excessive dirt attached to the cloth was detached to prepare muddy cloth.

Example 2

Detergent compositions according to the present invention (Inventions 10, 11, 12 and 13) were prepared respectively in the same manner as that employed in preparing the detergent compositions (Inventions 2 to 5) except that the crystalline silicate (2) prepared in Synthesis Example 2 was used instead of the crystalline silicate (1) in the same amount as that used therein. They were subjected to the same detergency test as that of Example 1. They exhibited excellent detergency.

TABLE 1

| | | Invention | | | | | |
|---|---|---|---|---|---|---|---|
| | | 1 | 2 | 3 | 4 | 5 | 6 |
| Formulation (wt. %) | LAS*1 | 25 | 25 | 25 | 25 | 25 | 25 |
| | AS*2 | 10 | 10 | 10 | 10 | 10 | 10 |
| | nonion*3 | 2.5 | 2.5 | 2.5 | 2.5 | 2.5 | 2.5 |
| | sodium salt of tallow fatty acid | 2.5 | 2.5 | 2.5 | 2.5 | 2.5 | 2.5 |
| | JIS No. 2 sodium silicate | 5 | 5 | 5 | 5 | 5 | 5 |
| | sodium carbonate | 10 | 10 | 10 | 10 | 10 | 10 |
| | potassium carbonate | 5 | 5 | 5 | 5 | 5 | 5 |
| | sodium sulfate | 4.8 | 4.8 | 4.8 | 4.8 | 4.8 | 4.8 |
| | PEG*4 | 1.5 | 1.5 | 1.5 | 1.5 | 1.5 | 1.5 |
| | cryst. silicate (1)*5 | | | | | | |
| | cryst. sodium aluminosilicate (zeolite 4A) | 20 | 20 | 20 | 15 | 15 | 15 |
| | tetrasodium N,N-bis(carboxymethyl)-glutamate | 2.5 | 2.5 | 3.5 | 7 | 3 | 5 |
| | polyacrylic acid (Mw = 8,000) | 2.5 | | | | | |

TABLE 1-continued

| | Invention | | | | | |
|---|---|---|---|---|---|---|
| | 1 | 2 | 3 | 4 | 5 | 6 |
| acrylic acid-maleic acid copolymer (Mw = 50,000) | | 2.5 | 1.5 | 3 | 7 | 5 |
| enzyme*[6] | 1.8 | 1.8 | 1.8 | 1.8 | 1.8 | 1.8 |
| fluorescent dye*[7] | 0.5 | 0.5 | 0.5 | 0.5 | 0.5 | 0.5 |
| perfume | 0.4 | 0.4 | 0.4 | 0.4 | 0.4 | 0.4 |
| water | 6 | 6 | 6 | 6 | 6 | 6 |
| detergency against sebum dirt (%) | 63.0 | 65.1 | 64.5 | 67.3 | 67.9 | 68.1 |
| detergency against mud dirt (%) | 60.2 | 59.6 | 58.7 | 60.9 | 61.8 | 61.8 |

TABLE 2

| | | Invention | | | Comp. | | | |
|---|---|---|---|---|---|---|---|---|
| | | 7 | 8 | 9 | 1 | 2 | 3 | 4 |
| Formulation (wt. %) | LAS*[1] | 22.5 | 20 | 20 | 25 | 25 | 25 | 25 |
| | AS*[2] | 10 | 10 | 7.5 | 10 | 10 | 10 | 10 |
| | nonion*[3] | 2.5 | 2.5 | 2.5 | 2.5 | 2.5 | 2.5 | 2.5 |
| | sodium salt of tallow fatty acid | 2.5 | 2.5 | 2.5 | 2.5 | 2.5 | 2.5 | 2.5 |
| | JIS No. 2 sodium silicate | 5 | 5 | 5 | 5 | 5 | 5 | 5 |
| | sodium carbonate | 10 | 10 | 10 | 10 | 10 | 10 | 10 |
| | potassium carbonate | 5 | 5 | 5 | 5 | 5 | 5 | 5 |
| | sodium sulfate | 4.8 | 4.8 | 4.8 | 4.8 | 4.8 | 4.8 | 4.8 |
| | PEG*[4] | 1.5 | 1.5 | 1.5 | 1.5 | 1.5 | 1.5 | 1.5 |
| | cryst. silicate (1)*[5] | 2.5 | 5 | 7.5 | | | | |
| | cryst. sodium aluminosilicate (zeolite 4A) | 20 | 20 | 20 | 25 | 20 | 20 | 20 |
| | tetrasodium N,N-bis(carboxymethyl)-glutamate | 2.5 | 2.5 | 2.5 | | 5 | | |
| | polyacrylic acid (Mw = 8,000) | | | | | | 5 | |
| | acrylic acid-maleic acid copolymer (Mw = 50,000) | 2.5 | 2.5 | 2.5 | | | | 5 |
| | enzyme*[6] | 1.8 | 1.8 | 1.8 | 1.8 | 1.8 | 1.8 | 1.8 |
| | fluorescent dye*[7] | 0.5 | 0.5 | 0.5 | 0.5 | 0.5 | 0.5 | 0.5 |
| | perfume | 0.4 | 0.4 | 0.4 | 0.4 | 0.4 | 0.4 | 0.4 |
| | water | 6 | 6 | 6 | 6 | 6 | 6 | 6 |
| detergency against sebum dirt (%) | | 64.8 | 65.6 | 66.7 | 51.8 | 58.5 | 60.2 | 61.4 |
| detergency against mud dirt (%) | | 58.8 | 59.0 | 60.1 | 48.6 | 49.7 | 57.3 | 55.6 |

(Notes)
*[1]sodium salt of linear alkyl($C_{12}$—$C_{13}$)benzenesulfonic acid
*[2]sodium alkyl($C_{12}$—$C_{18}$) sulfate
*[3]polyoxyethylene(average number of ethylene oxide molecules added: 8) alkyl($C_{12}$—$C_{14}$) ether
*[4]average molecular weight: 8,000
*[5]SKS-6 (a product of Hoechst Tokuyama Ltd., average particle diameter: 30 μm, δ-phase layer sodium silicate of $Na_2O.2.0\ SiO_2$, ion exchange capacity of $Na_2O.2SiO_2$: 220 $CaCO_3$ mg/g, pH of 0.1% dispersion: higher than 11)
*[6]a 2:1:1:1 mixture of Sabinase 12.0TW (a product of Novo Nordisk Industry), Lipolase 100T (a product of Novo Nordisk Industry), Ceiluzyme 0.1T (a product of Novo Nordisk Industry), and Termamyl 60T (a product of Novo Nordisk Industry)
*[7]a 1:1 mixture of Cinopal CBS-X (a product of Ciba-Geigy Corporation) and Cinopal DMS-X

We claim:

1. A detergent composition comprising (a) 15 to 50% by weight of an anionic surfactant, (b) a polymer comprising units derived from at least one member selected from the group consisting of monoethylenically unsaturated monocarboxylic acids and monoethylenically unsaturated dicarboxylic acids and having a weight-average molecular weight of 1,000 to 150,000, or a salt of the polymer, (c) an N,N-bis(carboxymethyl)glutamic acid salt represented by the following formula (I):

(I)

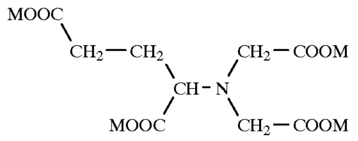

wherein M is a hydrogen atom, an alkali metal, an alkaline earth metal, an ammonium or a basic amino group, provided that a plurality of M's may be the same as or different from each other, and (d) 5 to 40% by weight of a crystalline aluminosilicate, the total amount of the components (b) and (c) being 1 to 20% by weight based on the composition, the weight ratio of the component (b) to the component (c) ranging from 1/10 to 10/1.

2. The composition according to claim 1, which comprises (a) 25 to 45% by weight of an anionic surfactant, (b) a polymer comprising units derived from at least one member selected from the group consisting of monoethylenically unsaturated monocarboxylic acids and monoethylenically unsaturated dicarboxylic acids and having a weight-average molecular weight of 10,000 to 100,000, or a salt of the polymer, (c) an N,N-bis(carboxymethyl)glutamic acid salt represented by the formula (I) as defined in claim 1, and (d) 10 to 35% by weight of a crystalline aluminosilicate, the total amount of the components (b) and (c) being 1 to 10% by weight based on the composition, the weight ratio of the component (b) to the component (c) ranging from 3/10 to 10/3.

3. The composition according to claim 1, wherein the component (b) comprises repeating units represented by the following formula (IV):

(IV)

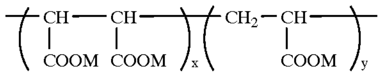

wherein M is a counter ion and a copolymerizing ratio of x/y ranges from 0/10 to 5/5 as a mole ratio.

4. The composition according to claim 1, which further contains a crystalline silicate.

5. The composition according to claim 1, which further contains a nonionic surfactant, an amphoteric surfactant, a cationic surfactant, a builder or an enzyme.

6. The composition according to claim 1, wherein in the formula (I) for the component (c) M is sodium.

* * * * *